US011884411B2

(12) United States Patent
Pautis et al.

(10) Patent No.: US 11,884,411 B2
(45) Date of Patent: Jan. 30, 2024

(54) AIRCRAFT ENGINE PYLON HAVING A MOVABLE ASSEMBLY OF COWLS

(71) Applicant: Airbus Operations (S.A.S.), Toulouse (FR)

(72) Inventors: Olivier Pautis, Toulouse (FR); Paolo Messina, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 71 days.

(21) Appl. No.: 17/708,220

(22) Filed: Mar. 30, 2022

(65) Prior Publication Data

US 2022/0315232 A1 Oct. 6, 2022

(30) Foreign Application Priority Data

Apr. 2, 2021 (FR) ...................................... 2103439

(51) Int. Cl.
*B64D 29/02* (2006.01)
*B64D 29/06* (2006.01)

(52) U.S. Cl.
CPC ............. *B64D 29/02* (2013.01); *B64D 29/06* (2013.01)

(58) Field of Classification Search
CPC ........ B64D 29/02; B64D 29/06; B64D 27/26; B64D 2027/262; B64D 2027/264
See application file for complete search history.

(56) References Cited

U.S. PATENT DOCUMENTS

| 4,428,609 A | 1/1984 | Baehr |
| 4,538,843 A | 9/1985 | Harris |
| 2017/0166317 A1 | 6/2017 | Queau et al. |

FOREIGN PATENT DOCUMENTS

| EP | 2 436 601 A1 | 4/2012 |
| FR | 3 079 216 A1 | 9/2019 |

OTHER PUBLICATIONS

French Search Report for Application No. 2103439 dated Dec. 9, 2021.

*Primary Examiner* — Andrew H Nguyen
(74) *Attorney, Agent, or Firm* — KDW Firm PLLC

(57) ABSTRACT

An engine pylon of an aircraft having a rear portion, two rear cowls around the rear portion, each rear cowl having an upper fixed cowl and a lower movable cowl mounted articulated on the rear portion, wherein in the closed position the two lower movable cowls are moved close to one another, such that their lower edges are contiguous, wherein in the open position the two lower movable cowls are tilted such that their lower edges are moved away from one another, for each lower movable cowl, a hinge system fixed between the lower movable cowl and the rear portion, and at least one locking system which locks the two lower movable cowls to one another in the closed position. The presence of the lower movable cowls ensures, among other things, easy access to the interior of the engine pylon.

7 Claims, 4 Drawing Sheets

AIRCRAFT ENGINE PYLON HAVING A MOVABLE ASSEMBLY OF COWLS

CROSS-REFERENCE TO RELATED APPLICATION

This application claims priority to French patent application number 2103439 filed on Apr. 2, 2021, the entire disclosure of which is incorporated by reference herein.

TECHNICAL FIELD

The disclosure herein relates to an aircraft engine pylon having a movable assembly of cowls making it possible to access the interior of the engine pylon, to an aircraft having a turbojet engine, a wing, and such an engine pylon for fixing the turbojet engine underneath the wing, and also to such a movable assembly of cowls.

BACKGROUND

An aircraft conventionally has an engine, for example a turbojet engine, which is fixed underneath a wing of the aircraft using an engine pylon. The engine pylon is constituted by, or comprises, a rigid structure which is fixed, on the one side, to a structure of the wing and, on the other side, to a structure of the engine. The engine pylon makes it possible to transfer forces generated by the engine to the structure of the wing, when the engine is in operation. The engine pylon also allows the passage of systems between the wing and the engine, such as for example the electrical system, the hydraulic system, pneumatic system, etc.

In order to limit the drag of the engine pylon, it is covered by an aerodynamic cowling constituted by an assembly of cowls. The cowls are positioned next to one another in order to create as smooth a surface as possible and are fixed either to the structure of the engine pylon or to the structure of the wing of the aircraft.

In order to access the interior of the engine pylon, removable flaps are provided on some of these cowls. The flaps are fixed by screw-fastener elements or rivets and, after they have been withdrawn, a technician can access the interior of the engine pylon and thus perform maintenance on the elements present.

The fixing of the cowls necessitates the presence of a relatively rigid and thus heavy structure. Moreover, because of manufacturing and assembly tolerances, it is not possible to juxtapose multiple cowls next to one another without space and discontinuity between these cowls appearing. These spaces and discontinuities may lead to a disturbance to the air flow and the emergence of acoustic phenomena. Lastly, the withdrawal of the flaps does not allow easy access to the interior of the engine pylon and their presence requires the installation of local structural reinforcement elements.

SUMMARY

A subject of the disclosure herein is therefore to provide an engine pylon having a movable assembly of cowls. Such a movable assembly of cowls makes it possible to open the engine pylon for easy access to the rear area of the engine pylon and to the systems it contains, in particular for maintenance and inspection tasks, and to the structure supporting this movable assembly of cowls which is simplified with respect to a structure of the prior art. Moreover, this movable assembly of cowls can be made with a reduced number of two cowls, distributed on either side of a vertical plane passing through the longitudinal axis of the engine, in order to reduce the disturbances to the air flow and the emergence of acoustic phenomena.

To that end, what is provided is an engine pylon of an aircraft, the engine pylon having:
 a support structure which has a front portion and a rear portion and is intended to fix an engine and a wing of the aircraft to one another;
 a front aerodynamic cowling formed by a front assembly of cowls, wherein the front aerodynamic cowling is fixed around the front portion of the support structure of the engine pylon;
 a rear aerodynamic cowling formed by a rear assembly of two cowls which are disposed around the rear portion of the support structure of the engine pylon, wherein each rear cowl takes the shape of a triangle, an upper edge of which is intended to run along the wing, a lower edge of which follows along the lower portion of the rear portion, and a front edge of which connects the two other edges at the front of the rear portion, wherein each rear cowl has an upper fixed cowl secured to the rear portion and a lower movable cowl mounted articulated on the rear portion between an open position and a closed position, wherein the upper fixed cowl and the lower movable cowl are separated by a separation line which is generally parallel to the upper edge, wherein in the closed position, the two lower movable cowls are moved close to one another and to the rear portion such that the lower edges of the two lower movable cowls are contiguous, wherein in the open position, the two lower movable cowls are tilted such that the lower edges of the two lower movable cowls are moved away from one another;
 for each lower movable cowl, a hinge system fixed between the lower movable cowl and the rear portion; and
 at least one locking system which locks the two lower movable cowls to one another in the closed position.

The presence of the lower movable cowls ensures, among other things, easy access to the interior of the engine pylon.

Advantageously, the articulation of each lower movable cowl is a rotation about an axis of rotation which is generally parallel to the separation line and close to the separation line.

Advantageously, each hinge system has at least two fixed fittings secured to the rear portion and, for each fixed fitting, a movable gooseneck fitting secured to the lower movable cowl.

Advantageously, the locking system has, for each lower movable cowl, a boss secured to the lower movable cowl and a recess made in the rear portion and intended to receive the boss in the closed position, and the locking system has a connecting pin which is fixed through a bore, which each boss has to that end.

Advantageously, each lower movable cowl is constituted by one and the same component.

The disclosure herein also provides an aircraft having a wing, an engine and an engine pylon according to one of the preceding variants, fixed between the wing and the engine.

The disclosure herein also provides a rear aerodynamic cowling of an engine pylon according to one of the preceding variants, wherein the rear aerodynamic cowling has a rear assembly of two cowls which are intended to be disposed around a rear portion of a support structure of the engine pylon, wherein each rear cowl takes the shape of a triangle, an upper edge of which is intended to run along a wing, a lower edge of which is intended to follow along a lower portion of the rear portion, and a front edge of which connects the two other edges at the front of the rear portion, wherein each rear cowl has an upper fixed cowl intended to be secured to the rear portion and a lower movable cowl intended to be mounted articulated on the rear portion between an open position and a closed position, wherein the upper fixed cowl and the lower movable cowl are separated by a separation line which is generally parallel to the upper edge, wherein in the closed position, the two lower movable cowls are moved close to one another and to the rear portion such that the lower edges of the two lower movable cowls are contiguous, wherein in the open position, the two lower movable cowls are tilted such that the lower edges of the two lower movable cowls are moved away from one another.

BRIEF DESCRIPTION OF THE DRAWINGS

The features of the disclosure herein that were mentioned above, and also others, will become more clearly apparent upon reading the following description of an example embodiment, the description being given in relation to the appended drawings, in which.

DETAILED DESCRIPTION

Figure 1:
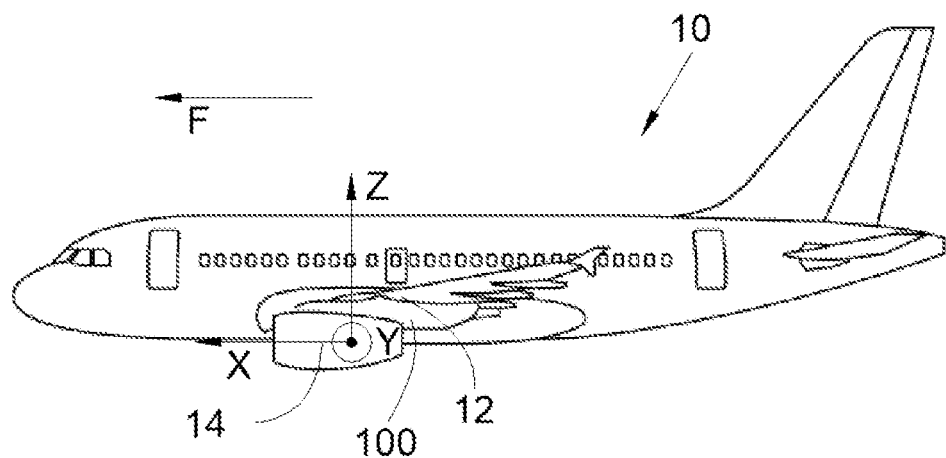
FIG. 1 is a side view of an aircraft according to the disclosure herein.

FIG. 1 shows an aircraft 10 which has an engine 14, for example a turbojet engine, and a wing 12 underneath which is fixed the engine 14 by way of an engine pylon 100 according to the disclosure herein.

In the following description, terms which relate to a position are taken with reference to an aircraft 10 in the normal flight position, that is to say as shown in FIG. 1, and the "front" and "rear" positions are taken with respect to the front and the rear of the engine 14 and with respect to the advancement direction F of the aircraft 10 when the engine 14 is operating.

In the following description and conventionally, X denotes the longitudinal direction of the engine 14 which is parallel to the longitudinal axis of the turbojet engine, Y denotes the transverse direction which is horizontal when the aircraft 10 is on the ground, and Z denotes the vertical direction which is vertical when the aircraft 10 is on the ground, these three directions X, Y and Z being mutually orthogonal.

Figure 2:
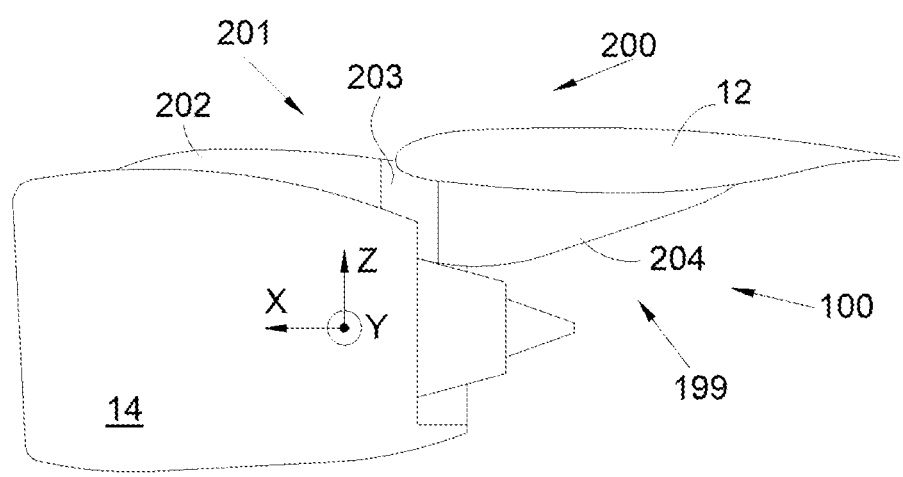
FIG. 2 is a side view of a propulsion assembly having an engine pylon according to the disclosure herein.

FIG. 2 shows the wing 12 and the engine 14 which are fixed to one another by way of the engine pylon 100, which has an aerodynamic cowling 200 having a front aerodynamic cowling 201 formed by a front assembly of cowls 202, 203 and a rear aerodynamic cowling 199 formed by two rear cowls 204.

In the embodiment of the disclosure herein presented here, the front assembly of cowls has a front cowl 202 and an intermediate cowl 203 disposed at the rear of the front cowl 202, but in another embodiment, the front cowl 202 and the intermediate cowl 203 may constitute one and the same cowl.

The rear cowls 204 are disposed at the rear, in line with the longitudinal direction of the turbojet engine 14, of the front assembly of cowls 202, 203.

In this instance, the rear cowls 204 are disposed underneath the wing 12 and at the rear of the engine 14 and the front cowl 202 is disposed over the top of the engine 14 and at the front of the wing 12. The intermediate cowl 203 forms the junction between the front cowl 202 and the rear cowl 204. There is an intermediate cowl 203, a front cowl 202 and a rear cowl 204 on each side of the engine pylon 100.

Figure 3:
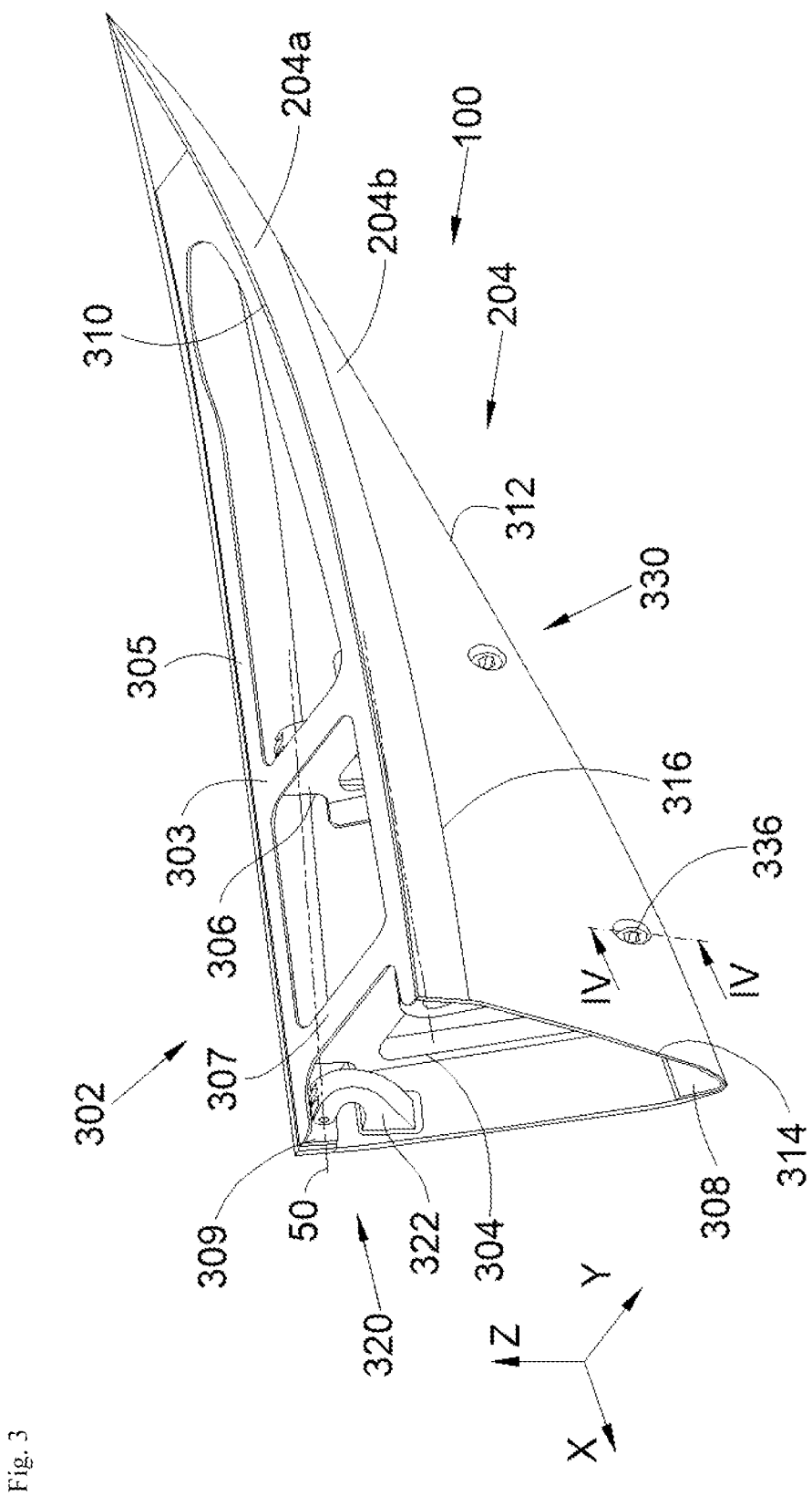
FIG. 3 is a perspective view of a rear aerodynamic cowling of the engine pylon according to the disclosure herein with movable cowls shown in the closed position.
Figure 5:
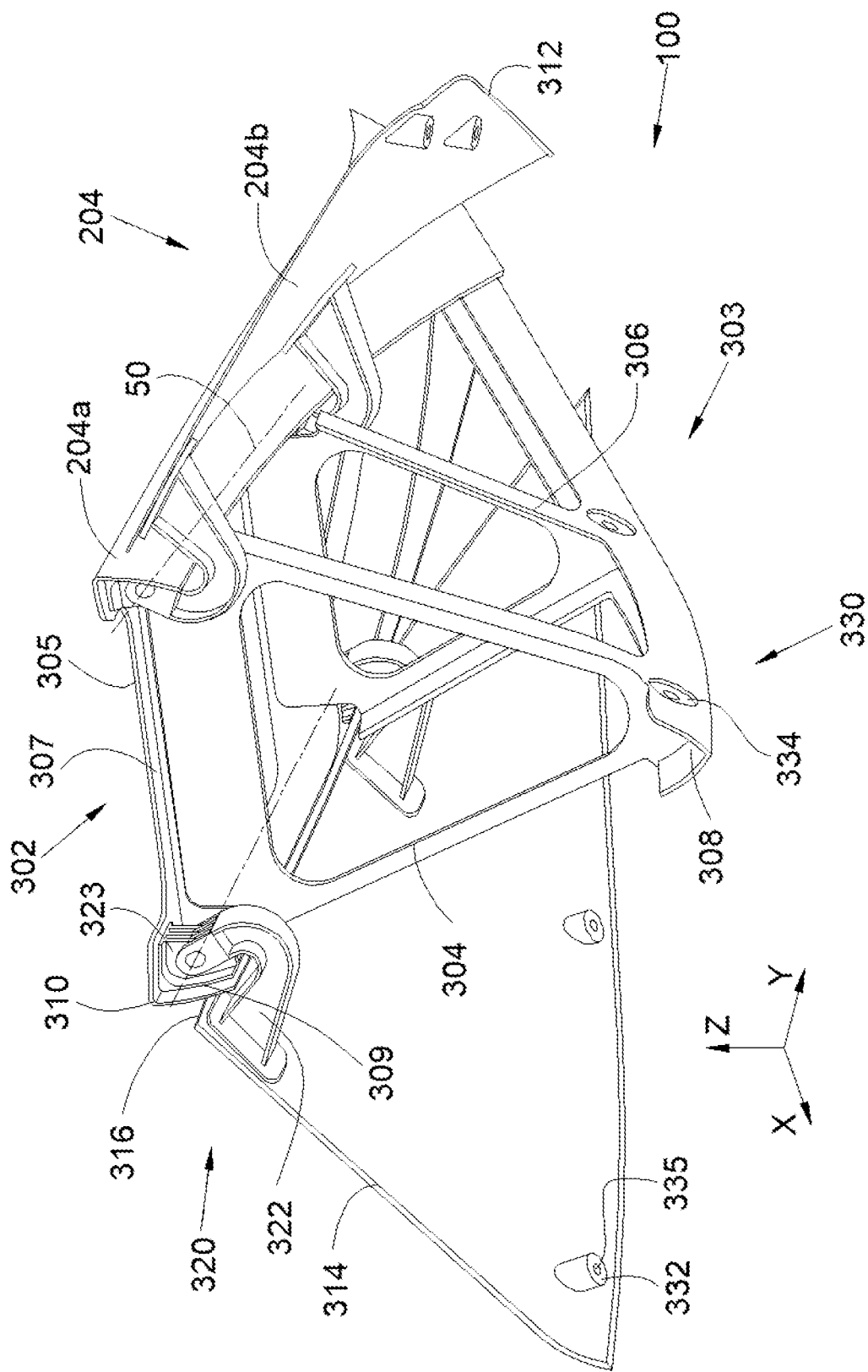
FIG. 5 is a perspective view of the rear aerodynamic cowling of the engine pylon according to the disclosure herein with the movable cowls shown in the open position.

FIG. 3 shows the engine pylon 100 in the closed position of the rear cowls 204 and FIG. 5 shows the engine pylon 100 in the open position of the rear cowls 204. It is not necessary for the two rear cowls 204 to be open at the same time.

The engine pylon 100 comprises a rigid structure, also referred to as primary structure, which is intended to fix a structure of the engine 14 and a structure of the wing 12 to one another.

Figure 4:
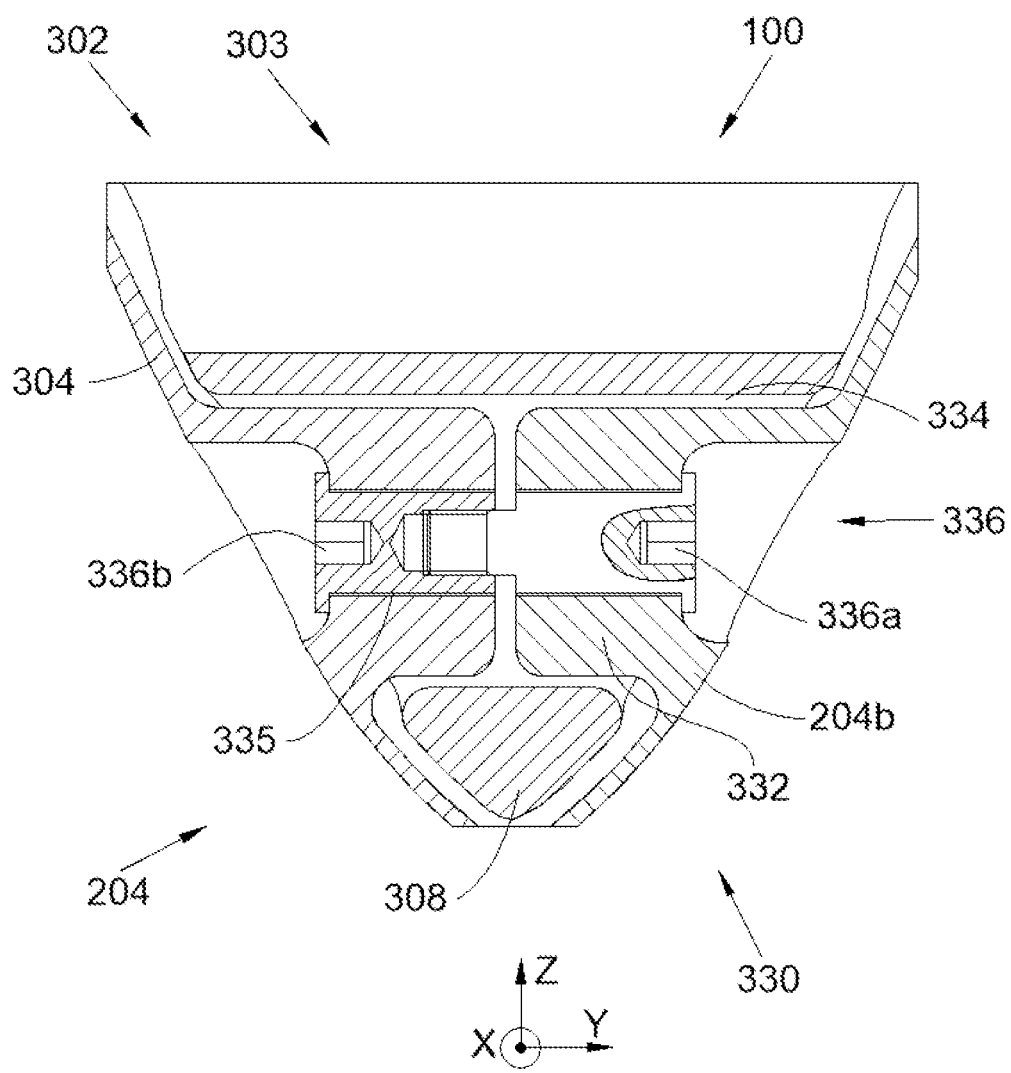
FIG. 4 is a sectional view along the line IV-IV in FIG. 3 at the level of a locking system for the movable cowls.

Moreover, the engine pylon 100 has a support structure 302 serving as support for the aerodynamic cowling 200. The support structure 302 has a front portion (not shown) and a rear portion 303 visible in FIGS. 3 to 5.

The front aerodynamic cowling 201, that is to say the front assembly of cowls comprising the intermediate cowls 203 and the front cowls 202, is fixed around the front portion of the support structure 302.

The rear cowls 204 are fixed around the rear portion 303 of the support structure 302 which is itself fixed to the structure of the wing 12 using any suitable approach known to a person skilled in the art.

The rear portion 303 has the overall shape of a triangular prism, the two triangular bases of which are in planes perpendicular to the longitudinal direction X, an upper triangular face of which is oriented upwards and is positioned facing the wing 12 so as to be fixed there, and the two other faces of which are disposed to port and to starboard and meet towards the bottom.

The upper triangular face of the prism constitutes an upper spar 305, the upper face of which provides the junction with the wing 12.

In the embodiment of the disclosure herein presented in FIGS. 3 and 5, the upper spar 305 has in its lateral peripheries turned-over edges 309 extending downwardly and also transverse stiffeners 307 extending in the transverse direction Y.

In this instance, each triangular base constitutes one rib 304, 306, but it is possible to have more ribs there disposed one behind another parallel to the longitudinal direction X depending on the desired rigidity and the longitudinal extent of the rear portion 303. Each rib 304, 306 thus takes the shape of a triangle, a lower vertex of which is oriented downwardly and a base of which is oriented upwardly, that is to say towards the wing 12. Here, each transverse stiffener 307 is positioned in line with a rib 304, 306 and the base of the rib 304, 306 provides the junction with the transverse stiffener 307 of the upper spar 305.

The framework also has a column 308 which extends along the lower edge of the triangular prism, that is to say in this instance the lower vertex of each rib 304, 306. The column 308 is secured to the lower vertex of each rib 304, 306 and extends generally parallel to the longitudinal direction X.

Towards the rear of the engine pylon 100, the column 308 rises towards the wing 12.

Each rear cowl 204 takes the shape of a triangle, an upper edge 310 of which runs along the wing 12, a lower edge 312 of which follows the column 308, that is to say along the lower portion of the rear portion 303, and a front edge 314 of which connects the two other edges 310 and 312 at the front of the rear portion 303.

Each rear cowl 204 has an upper fixed cowl 204a and a lower movable cowl 204b which are separated by a separation line 316 which is generally parallel to the upper edge 310. Each rear cowl 204 is thus subdivided by the separation line 316 into an upper fixed cowl 204a which extends along the wing 12 between the separation line 316 and the upper edge 310, and a lower movable cowl 204b which extends between the separation line 316 and the lower edge 312.

The upper fixed cowls 204a are secured to the rear portion 303, and more particularly here to the turned-over edges 309 of the upper spar 305 of the rear portion 303.

Each lower movable cowl 204b is mounted articulated on the rear portion 303, and more particularly here on the upper spar 305, between an open position (FIG. 5) and a closed position (FIG. 3) and the articulation is a rotation about an axis of rotation 50.

In the closed position, the two lower movable cowls 204b are moved close to one another and to the rear portion 303 such that the lower edges 312 of the two lower movable cowls 204b are contiguous and constitute the trailing edge of the engine pylon 100.

In the open position, the two lower movable cowls 204b are tilted such that the lower edges 312 of the two lower movable cowls 204b are moved away from one another and so as to open up a space allowing access to the interior of the engine pylon 100.

To transition from the closed position to the open position, each lower movable cowl 204b is raised towards the outside of the engine pylon 100.

To that end, for each lower movable cowl 204b, the engine pylon 100 has a hinge system 320 which is fixed between the lower movable cowl 204b and the rear portion 303 and provides the articulation between the lower movable cowl 204b and the rear portion 303, and more particularly here between the upper spar 305 and the lower movable cowl 204b. There are therefore two hinge systems 320, one per side.

Each hinge system 320 has at least two fixed fittings 323 secured to the upper spar 305, and more generally to the rear portion 303, and, for each fixed fitting 323, a movable gooseneck fitting 322 which is secured to the lower movable cowl 204b and allows a large clearance during the rotation while remaining invisible from the outside.

In the embodiment of the disclosure herein presented in FIGS. 3 and 5, each movable fitting 322 is positioned facing a fixed fitting 323 to form a system of yokes having a common alignment of bores for forming the axis of rotation 50 of the hinge system 320.

This axis of rotation 50 is generally parallel to the separation line 316 and close to the separation line 316.

The engine pylon 100 also has at least one locking system 330 which locks the two lower movable cowls 204b to one another in the closed position.

Such an engine pylon 100 with lower movable cowls 204b has a simple and lightweight structure and access to it is facilitated.

In the embodiment of the disclosure herein presented, there are two locking systems 330 distributed along the lower edges 312. Of course, a different number is possible depending on the length of the lower edge 312 to be locked.

The locking system 330 has, for each lower movable cowl 204b, a boss 332 secured to the lower movable cowl 204b and a recess 334 made in the rear portion 303, in this instance the column 308, and intended to receive the boss 332 in the closed position and thus to form a centring system to correctly position the lower movable cowl 204b in the closed position.

The locking system 330 also has a connecting pin 336 which is fixed through a bore 335, which each boss 332 has to that end. Such a locking system 330 has the advantage of being hidden and it does not disturb the air flow along the lower movable cowls 204b. The connecting pin takes for example the form of a binding screw.

The connecting pin 336 has a screw 336a with a threaded rod and a head having an impression that allows the screw 336a to be screwed in and unscrewed using a suitable tool. In the embodiment of the disclosure herein presented here, the head is a hexagonal socket head.

The connecting pin 336 has a nut 336b taking the form of a stepped nut, a cap nut, and also having an impression allowing the nut 336b to be screwed in and unscrewed using a suitable tool. In the embodiment of the disclosure herein presented here, the nut 336b also has a hexagonal socket.

In one embodiment, and with the aim of limiting disturbance to the aerodynamic flow, the two ends of the connecting pin 336 could be covered by an end cap or by a thermosetting paste, such as mastic, for example.

Advantageously, each lower movable cowl 204b is constituted by one and the same component, for example made by moulding, thus limiting the presence of a junction area that can disturb the air flow. Each rear cowl 204 has a single separation line 316 which extends generally parallel to the air flow in flight.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority

The invention claimed is:

1. An engine pylon of an aircraft, the engine pylon comprising:
   a support structure having a front portion and a rear portion, the support structure being configured for fixing an engine and a wing of the aircraft to one another;
   a front aerodynamic cowling formed by an assembly of front cowls, wherein the front aerodynamic cowling is fixed around the front portion of the support structure of the engine pylon;
   a rear aerodynamic cowling comprising:
   an assembly of two rear cowls which are disposed around the rear portion of the support structure of the engine pylon, wherein:
   each rear cowl has an approximately triangular shape;
   an upper edge of the approximately triangular shape is configured to run along the wing;

a lower edge of the approximately triangular shape follows along a lower portion of the rear portion; and a front edge of the approximately triangular shape connects the upper edge and the lower edge at a front of the rear portion;

each rear cowl has:
- an upper fixed cowl secured to the rear portion; and
- a lower movable cowl mounted articulated on the rear portion, between an open position and a closed position;
- wherein the upper fixed cowl and the lower movable cowl are separated by a separation line which is generally parallel to the upper edge;
- wherein, in the closed position, the two lower movable cowls are moved close to one another and to the rear portion such that the lower edges of the two lower movable cowls are contiguous with each other and constitute a trailing edge of the engine pylon; and
- wherein, in the open position, the two lower movable cowls are tilted such that the lower edges of the two lower movable cowls are moved away from one another;

for each lower movable cowl, a hinge system fixed between the lower movable cowl and the rear portion; and at least one locking system which locks the two lower movable cowls to one another in the closed position;

wherein the at least one locking system has, for each lower movable cowl:
- a boss secured to the lower movable cowl, the boss having a bore formed therein;
- a recess made in the rear portion to receive the boss in the closed position; and
- a connecting pin which is fixed through the bore.

2. The engine pylon according to claim 1, wherein articulation of each lower movable cowl is a rotation about an axis of rotation which is generally parallel to the separation line and close to the separation line.

3. The engine pylon according to claim 1, wherein each hinge system comprises:
- at least two fixed fittings secured to the rear portion; and
- for each of the at least two fixed fittings, a movable gooseneck fitting secured to the lower movable cowl.

4. The engine pylon according to claim 1, wherein each lower movable cowl is constituted by one and a same component.

5. An aircraft comprising:
- a wing;
- an engine; and
- the engine pylon according to claim 1, which is fixed between the wing and the engine.

6. The engine pylon according to claim 1, wherein the recess is shaped to engage with the boss in a form of a centering system, so as to correctly position the lower movable cowl in the closed position.

7. A rear aerodynamic cowling for an engine pylon, the rear aerodynamic cowling comprising:

an assembly of two rear cowls for being disposed around a rear portion of a support structure of the engine pylon, wherein:

each rear cowl has an approximately triangular shape;

an upper edge of the approximately triangular shape is configured to run along a wing;

a lower edge of the approximately triangular shape is configured to follow along a lower portion of the rear portion; and a front edge of the approximately triangular shape connects the upper edge and the lower edge at a front of the rear portion;

each rear cowl has:
- an upper fixed cowl for being secured to the rear portion; and
- a lower movable cowl for being mounted articulated on the rear portion, between an open position and a closed position;
- wherein the upper fixed cowl and the lower movable cowl are separated by a separation line which is generally parallel to the upper edge;
- wherein, in the closed position, the two lower movable cowls are moved close to one another and to the rear portion such that the lower edges of the two lower movable cowls are contiguous with each other and constitute a trailing edge of the engine pylon; and
- wherein, in the open position, the two lower movable cowls are tilted such that the lower edges of the two lower movable cowls are moved away from one another.

* * * * *